(12) United States Patent
Vo

(10) Patent No.: US 7,501,804 B2
(45) Date of Patent: Mar. 10, 2009

(54) ADAPTIVE DC TO DC CONVERTER SYSTEM

(76) Inventor: Hai Huu Vo, 1142 Matterhorn Dr., San Jose, CA (US) 95132

( * ) Notice: Subject to any disclaimer, the term of this patent is extended or adjusted under 35 U.S.C. 154(b) by 0 days.

(21) Appl. No.: 11/474,000

(22) Filed: Jun. 22, 2006

(65) Prior Publication Data

US 2007/0236196 A1    Oct. 11, 2007

Related U.S. Application Data

(60) Provisional application No. 60/790,687, filed on Apr. 10, 2006.

(51) Int. Cl.
*G05F 1/40* (2006.01)
(52) U.S. Cl. ...................... 323/282
(58) Field of Classification Search ............... 323/282, 323/283, 284, 285, 351
See application file for complete search history.

(56) References Cited

U.S. PATENT DOCUMENTS

| | | | | |
|---|---|---|---|---|
| 3,946,273 A | * | 3/1976 | Goddard | 315/297 |
| 4,190,791 A | * | 2/1980 | Hicks | 315/408 |
| 5,055,767 A | * | 10/1991 | Nelson | 323/285 |
| 5,239,275 A | * | 8/1993 | Leitch | 332/152 |
| 6,127,885 A | * | 10/2000 | Colangelo | 330/10 |
| 6,489,756 B2 | * | 12/2002 | Kanouda et al. | 323/284 |
| 6,906,502 B2 | | 6/2005 | Kernahan et al. | |
| 6,909,266 B2 | | 6/2005 | Kernahan et al. | |
| 6,917,188 B2 | | 7/2005 | Kernahan | |
| 6,965,220 B2 | | 11/2005 | Kernahan et al. | |
| 2004/0145922 A1 | | 7/2004 | Jutras et al. | |
| 2004/0189237 A1 | | 9/2004 | Imai et al. | |
| 2005/0116698 A1 | | 6/2005 | Prinz et al. | |
| 2006/0055384 A1 | | 3/2006 | Jordan et al. | |
| 2006/0252388 A1 | * | 11/2006 | Luu | 455/108 |

OTHER PUBLICATIONS

PCT search report and written opinion—PCT/US2005/43796—dated Oct. 10, 2007.

* cited by examiner

*Primary Examiner*—Adolf Berhane
(74) *Attorney, Agent, or Firm*—Tue Nguyen

(57) ABSTRACT

The present invention discloses an integrated voltage regulator comprising a switching regulation and an additional regulation mechanism. The additional regulation mechanism permits better control of the voltage regulator to enable improved performance. The present invention integrated voltage regulator provides an output voltage Vout in the form $$Vout=(Vin-Vamp)*(Duty\ Cycle)-Vslew$$

where the additional regulation mechanism comprises an amplitude modulation Vamp to modulate the input voltage Vin, a slew rate modulation Vslew to modulate the output voltage Vout, or a combination of amplitude modulation and slew rate modulation.

17 Claims, 19 Drawing Sheets

ADAPTIVE DC TO DC CONVERTER SYSTEM

This application claims priority from U.S. provisional applications Ser. No. 60/790,687, filed Apr. 10, 2006, entitled "Adaptive DC to DC Converter System", which is incorporated herein by reference.

This application is related to co-pending applications Ser. Nos. 11/474,001, 11/473,999, 11/473,998, 11/473,997 and 11/473,917, filed on Jun. 22, 2006. entitled "Adaptive DC to DC Converter System" of the same inventor.

BACKGROUND OF THE INVENTION

Advances in electronic technology require a highly regulated voltage supply, regardless of the fluctuation in loads or input power sources. The two fundamental techniques to produce regulated voltage are linear voltage regulator and switching voltage regulator. Linear voltage regulators are typically an amplitude modulation circuit in which the amplitude of the input unregulated voltage is modulated to achieve the constant output voltage. Switching voltage regulators typically employ a duty cycle modulation circuit in which the duty cycle (the percent of the circuit ON time) of the unregulated voltage is modulated.

Linear voltage regulators are simple and cost effective, with quick response and quiet since there is no high-frequency switching noise. The major drawback of linear voltage regulators is the voltage drop in the amplitude modulation circuit, resulting in a loss of power transfer efficiency with high heat dissipation. Switching voltage regulators operate by rapidly turning on and off the input power supply, thus the voltage drop across the duty cycle modulation can be small, resulting in higher power transfer efficiency and less heat dissipation. In return, the design of switching voltage regulators is complex, such as the requirements of high frequency switching circuit and the filtering circuit of the output voltage to achieve low ripple output voltage.

To combine the benefits, some designs use both regulation methods in board level series. For example, a switching voltage regulator may provide the initial regulation and efficiently generate an intermediate voltage slightly above the ultimate output voltage, then this intermediate voltage is further regulated by a linear voltage regulator. This hybrid circuit still suffers from large circuit area, and a somewhat slower response to output voltage disturbances.

SUMMARY OF THE DESCRIPTION

The present invention discloses an integrated voltage regulator comprising a switching regulation and an additional regulation mechanism. The additional regulation mechanism permits a better control of the voltage regulator to enable better performance. The present invention integrated voltage regulator provides an output voltage Vout in the form Vout=(Vin−Vamp)*(Duty Cycle)−Vslew where the additional regulation mechanism comprises an amplitude modulation Vamp to modulate the input voltage Vin, a slew rate modulation Vslew to modulate the output voltage Vout, or a combination of amplitude modulation and slew rate modulation.

The present invention further comprises an algorithm to regulate an output voltage by setting of the duty cycle through the switching modulation first, and then the amplitude or the slew rate is adjusted accordingly. The transition points between the duty cycle modulation and the amplitude and slew rate modulations is selected to achieve minimum switching frequency and minimum voltage swing for minimize the switching power loss and maximize the conversion efficiency.

The target voltage can also be divided into multiple ranges of voltage operation with each range of operation having different control parameters for different performance characteristics. The output variations can be compiled to create a history of the converter performance, which can be used to adapt the control parameters of the converter for the best performance. These adaptive parameters can be used for totally or partially replacing the calibration process, or lessening the parametric dependency of the converter's topology and configuration.

The switching regulation topology circuit is preferably a DC to DC converter, which can be buck converter, boost converter, buck-boost converter, flyback converter, forward converter, Ćuk converter, inverting charge-pump, and SEPIC converter, with Pulse width modulation (PWM) or pulse frequency modulation (PFM) circuitry. The circuit can also comprise protection or compensation circuitry such as overcurrent protection or overtemperature protection.

DETAIL DESCRIPTION OF THE INVENTION

The present invention discloses a novel voltage or current regulator permitting better control and better performance. The voltage/current regulator according to the present invention is an integrated circuit voltage/current regulator comprising a switching regulation and an additional regulation mechanism. The two mechanisms are integrated in chip level circuitry, thus providing smaller area, faster response, and other benefits such as waveform control and voltage/current regulation control that are not available in board level combination. The additional regulation mechanism can be an amplitude modulation to modulate the input voltage/current, a slew rate modulation to modulate the slopes (rising slope and/or falling slope) of the switching output voltage/current, or a combination of amplitude modulation and slew rate modulation.

Figure 1:
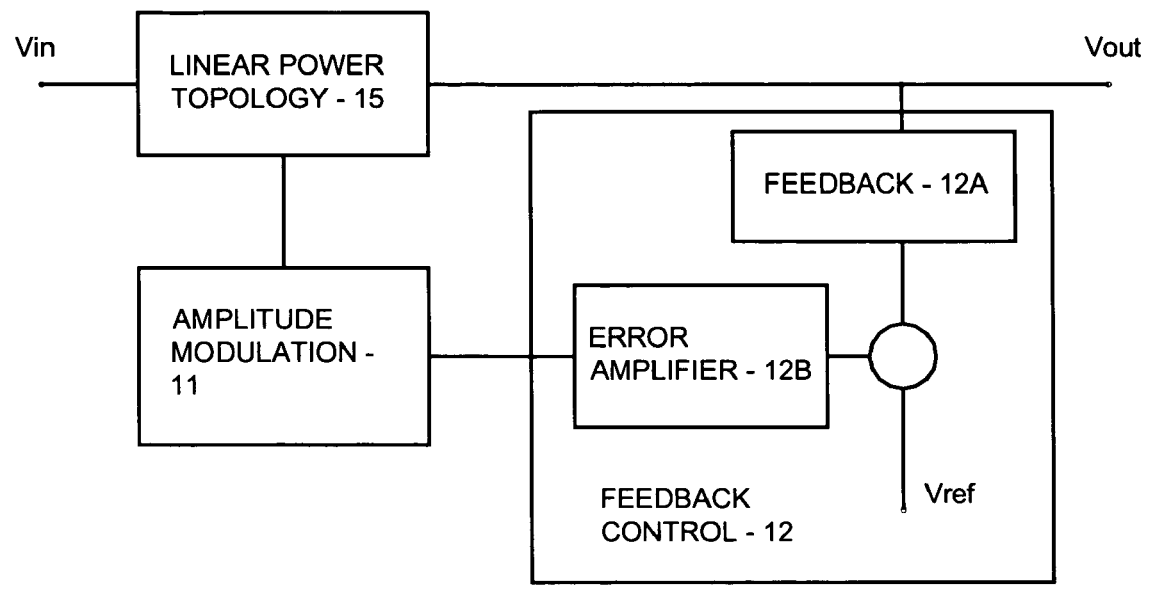
FIG. 1 shows a prior art linear voltage regulator.

FIG. 1 shows a prior art block diagram of a linear voltage regulator, comprising an amplitude modulation block 11 which is controlled by a control block 12. A simple amplitude modulation circuitry for linear voltage regulators is a variable resistor R connected in series between the input and the output, with the resistance of the variable resistor proportional to the output voltage. Another amplitude modulation circuitry comprises a voltage-controlled current source across a constant resistor R. The output voltage Vout of a linear voltage regulator is thus Vout=Vin−Vdrop, with Vdrop being the voltage dropped across the resistor R. If the output voltage changes due to changing load or changing input voltage, the variable resistor also changes proportionally, resulting in bringing the output voltage back to the constant value. The input of the control block 12 is the output voltage Vout, which enters a feedback circuitry 12A, then compares with a reference voltage Vref, and the voltage difference is then amplified through an error amplifier circuit 12B. The amplitude modulation block 11 takes the error signal from the control block 12 to generate a amplitude modulation control signal, and the amplitude modulation control signal then controls the voltage drop Vdrop between the input voltage Vin and the output voltage Vout through the linear power topology circuit 15.

Figure 2:
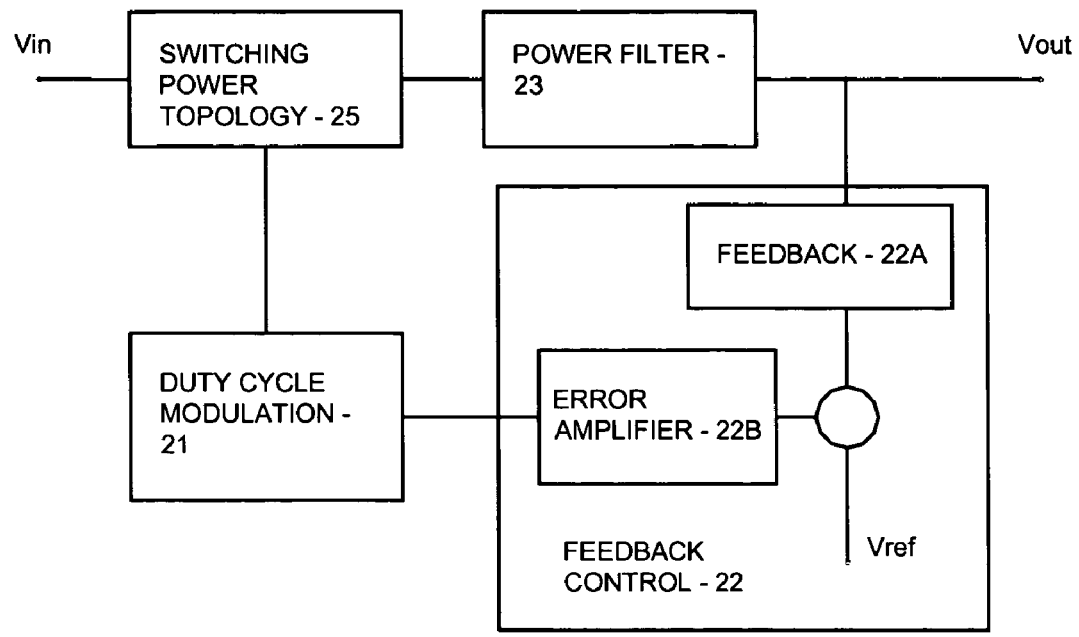
FIG. 2 shows a prior art switching voltage regulator with a switching voltage waveform.
Figure 2:
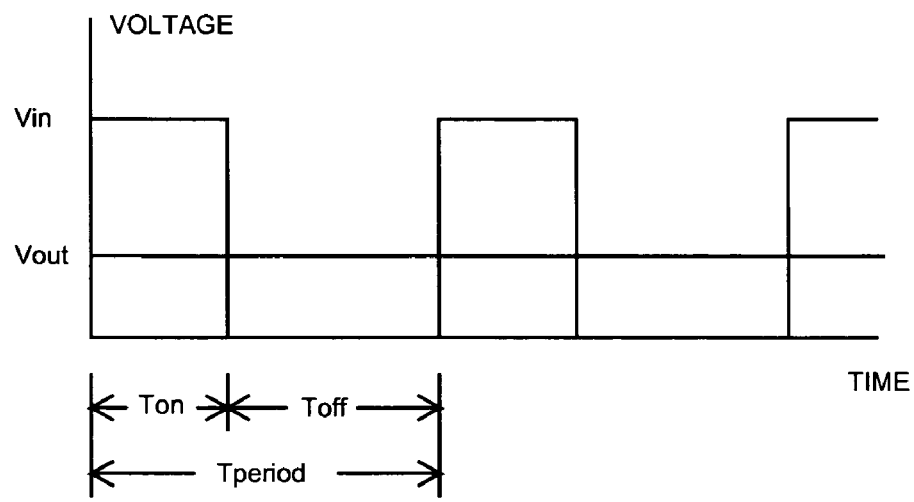

FIG. 2 shows a prior art block diagram of a switching voltage regulator, comprising a duty cycle modulation block 21 which is controlled by a control block 22. A simple duty cycle modulation circuit comprises a switch to turn on or off the input voltage. The output voltage Vout of a switching voltage regulator is thus Vout=Vin*(Duty Cycle), with Duty Cycle being the ratio of the circuit ON time over the ON+OFF time. If the output voltage changes due to changing load or changing input voltage, the OFF time of the switch also changes proportionally, resulting in bringing the output voltage back to the constant value. Two basic methods of duty cycle modulation is Pulse Width Modulation (PWM) where the pulse width is modulated with respect to the controlled voltage, and Pulse Frequency Modulation (PFM) where the pulse frequency is modulated with respect to the controlled voltage. The switching voltage regulator typically includes an output power filter circuit 23 to reduce voltage ripples due to the switching actions. The control block is similar as in linear voltage regulator, with the input of the control block 22 is the output voltage Vout, which enters a feedback circuitry 22A, then compares with a reference voltage Vref, and the voltage difference is then amplified through an error amplifier circuit 22B. The duty cycle modulation block 21 takes the error signal from the control block 22 to generate a duty cycle modulation control signal, and the duty cycle modulation control signal then controls the ON–OFF time of the input voltage Vin through the switching power topology circuit 25. FIG. 2 also shows a typical waveform of the switching voltage regulator circuit, with the duty cycle is the ratio of the ON time Ton of the circuit over the period of the switching cycle Tperiod. The output voltage Vout is then Vout=Vin (Ton/Tperiod).

In one embodiment, the present invention discloses an integrated voltage regulator comprising a switching regulation together with an additional modulation. The output voltage Vout according to the present invention voltage regulation can be expressed as:

$$Vout=(Vin-Vmod1)*(Duty\ Cycle)-Vmod2$$

The additional regulation mechanism can comprise a first modulation term Vmod1 to varying the portion of the power related to the ON time of the duty cycle. The first modulation term Vmodl is typically an amplitude modulation, varying the input voltage Vin. The additional regulation mechanism can comprise a second modulation term Vmod2 to varying the portion of the power unrelated to the ON time of the duty cycle. The second modulation term Vmod2 is typically a slew rate modulation, defined as the slope of the rising or falling voltage, or dV/dt, the rate of change of the voltage with respect to time. The slew rate can be the same or different for the rising or falling slopes. Switching voltage regulators are typically designed with constant optimum slew rate for a sharp response (e.g. infinite slew rate, meaning instantaneous response of voltage with respect to time), wherein the present invention provides a controllable slew rate for better regulation performance. The slew rate modulation circuitry can regulate the output voltage in addition to the switching modulation. Different slew rates can be used for rising or falling slopes. The additional regulation mechanism can also comprise a first modulation term Vmodl and a second modulation term Vmod2. These two modulation terms are represented by the voltage Vmod1 or Vmod2 as above, but they could be represented by a voltage ratio Vmod1/Vin or Vmod2/Vin.

The description mentions voltage regulator, but the present invention is not so limited, and can be applied to current regulator as well.

Figure 3A:
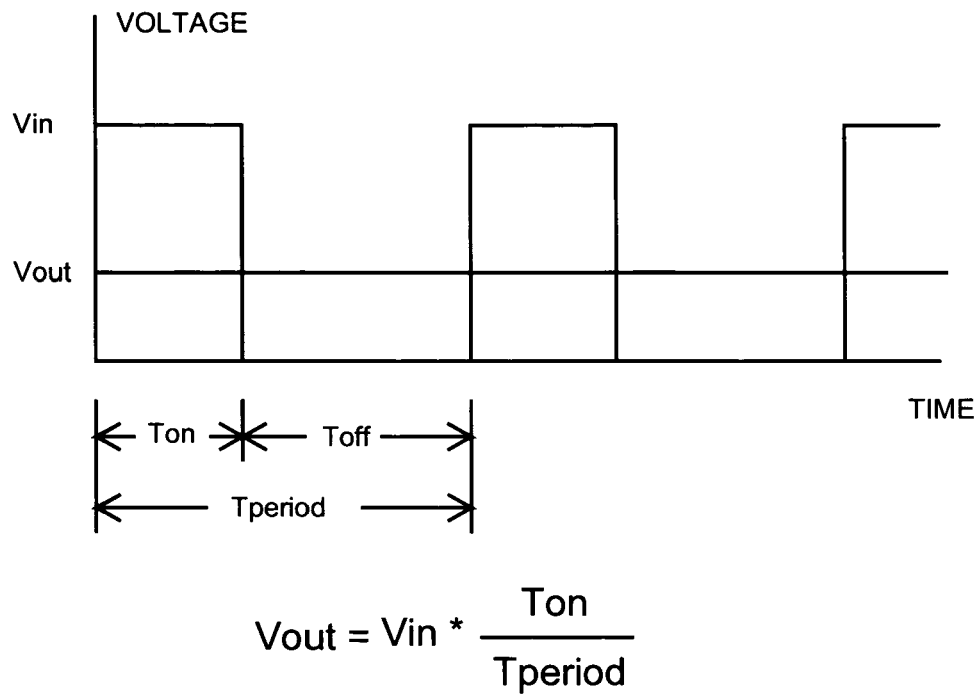
FIGS. 3A-3D shows voltage representations of the present invention voltage regulator.
Figure 3B:
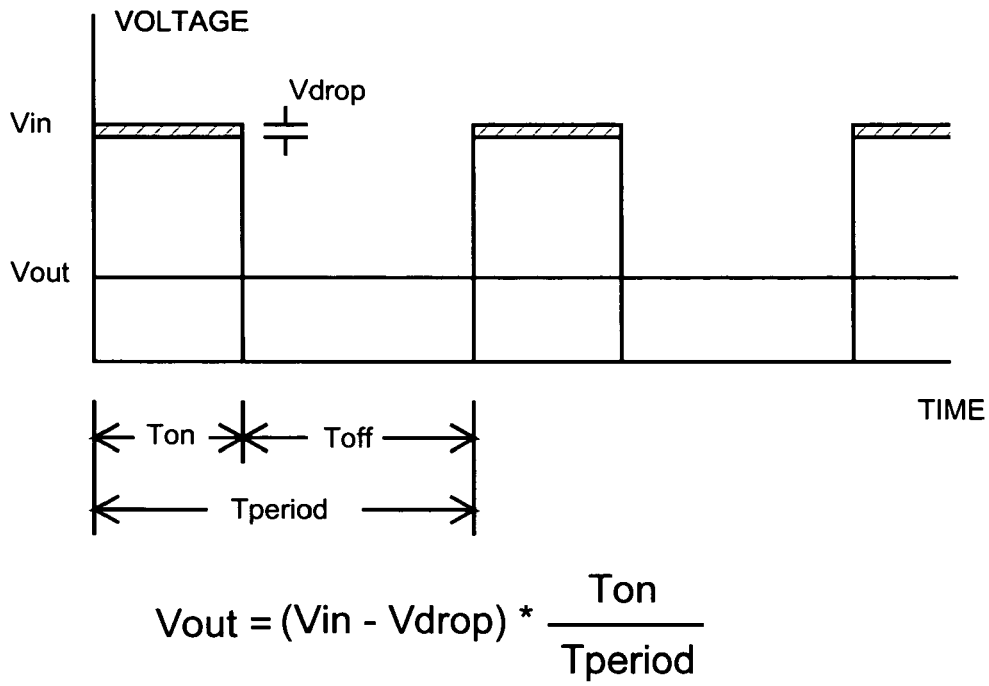
Figure 3C:
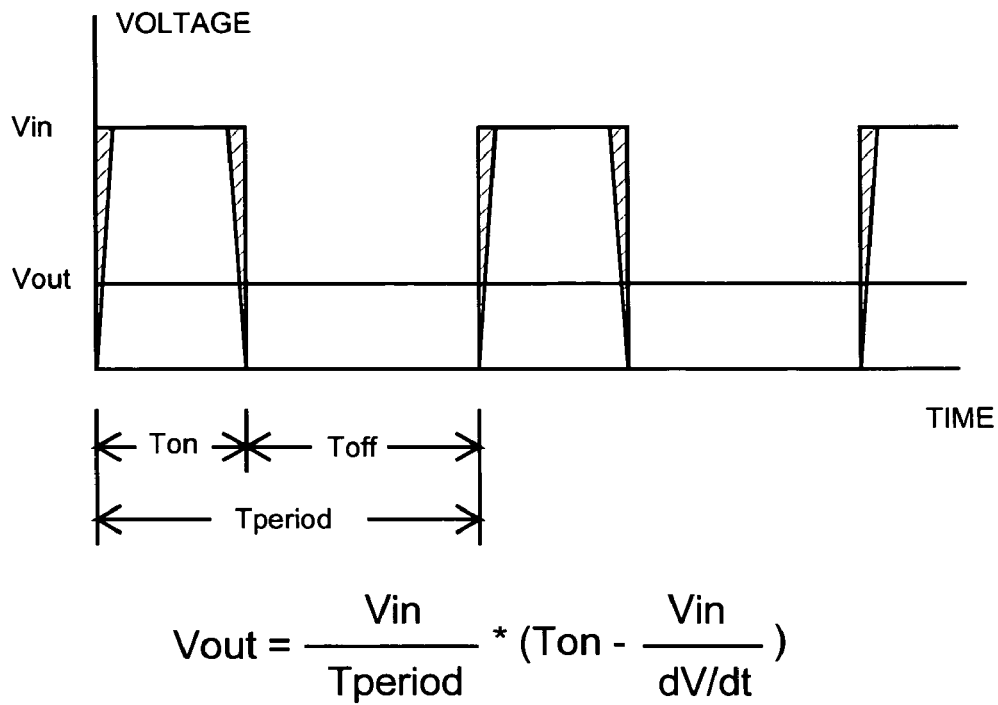
Figure 3D:
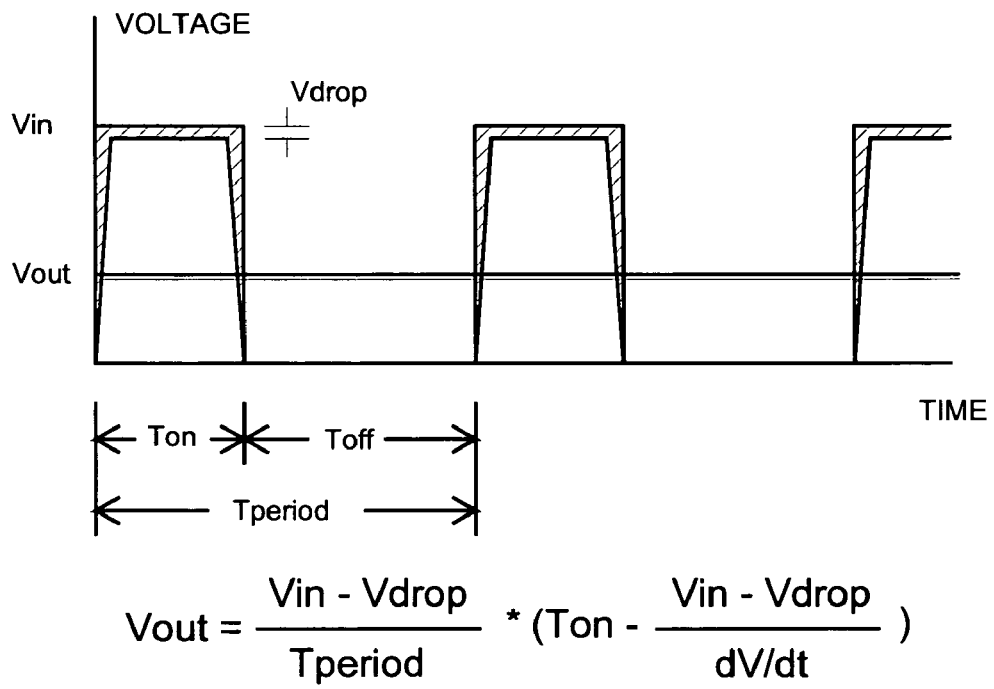

FIGS. 3A, 3B, 3C and 3D show a switching modulation waveform (A), an additional amplitude modulation waveform (B), an additional slew rate modulation waveform (C), and an addition amplitude and slew rate modulation waveform (D) with corresponding modulation terms. The addition modulation in FIG. 3B is an amplitude modulation, representing by the term Vdrop, modifying the input voltage Vin. The addition modulation in FIG. 3C is a slew rate modulation, representing by the term Vin/dV/dt, modifying the ON time of the switching regulator. The slew rate modification affects the rise time and the fall time equally as shown, but in general, the voltage rate of change for the rise time and the fall time could be different. The addition modulation in FIG. 3D is both amplitude and slew rate modulation, representing the terms Vin−Vdrop and (Vin−Vdrop)/dV/dt, modifying both the input voltage and the slew rate of the switching voltage.

In an embodiment of the present invention, the additional modulation is an amplitude modulation circuit. Thus the integrated voltage regulator comprises a switching modulation circuit and an amplitude modulation circuit. In a variation of this embodiment, the present invention discloses an improvement to a duty cycle modulation switching voltage regulator with the improvement comprising an amplitude modulation circuit to regulate the output voltage. In another variation of this embodiment, the present invention discloses an improvement to an amplitude modulation linear voltage regulator with the improvement comprising a duty cycle modulation circuit to regulate the output voltage.

In another embodiment of the present invention, the additional modulation is a slew rate modulation circuit. Thus the integrated voltage regulator comprises a switching modulation circuit and a slew rate modulation circuit. In a variation of this embodiment, the present invention discloses an improvement to a duty cycle modulation switching voltage regulator with the improvement comprising a slew rate modulation circuit to regulate the output voltage.

In another embodiment of the present invention, the additional modulation is an amplitude modulation circuit together with a slew rate modulation circuit. Thus the integrated voltage regulator comprises a switching modulation circuit and an amplitude modulation circuit with a slew rate modulation circuit. In a variation of this embodiment, the present invention discloses an improvement to a duty cycle modulation switching voltage regulator with the improvement comprising an amplitude modulation circuit and a slew rate modulation circuit to regulate the output voltage.

Figure 4:
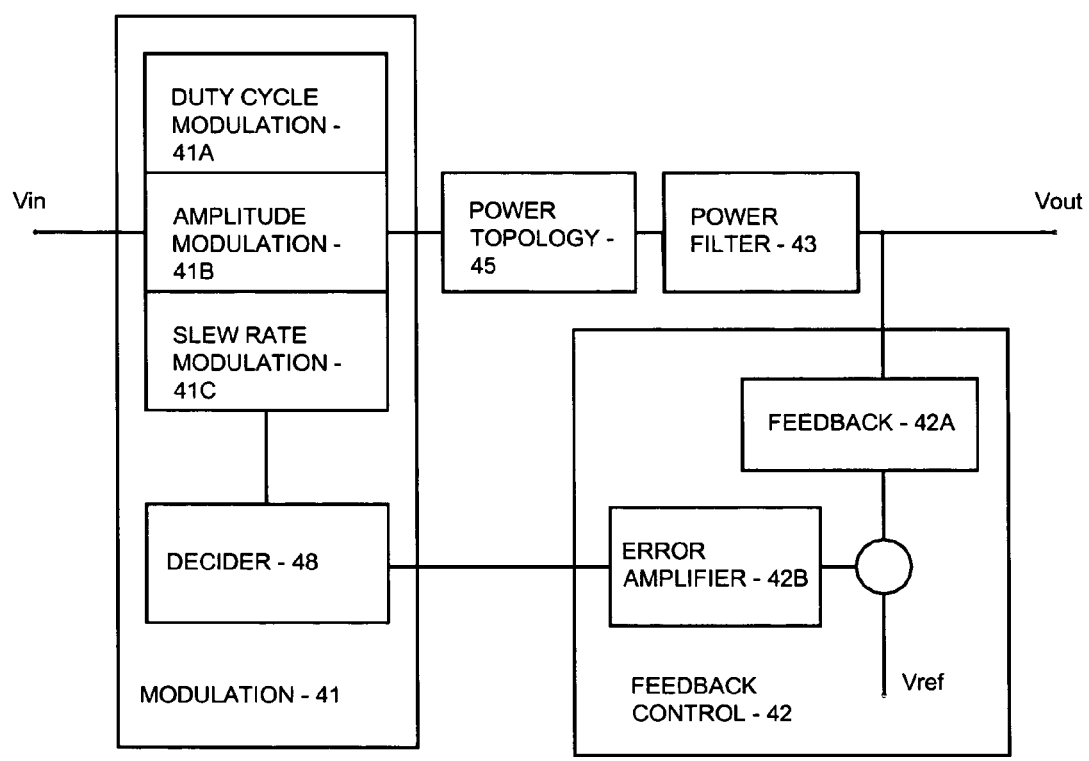
FIG. 4 shows an embodiment of the present invention integrated voltage regulator comprising a switching voltage regulator, an amplitude regulator, and a slew rate modulator.

FIG. 4 shows a block diagram of a circuit according to this embodiment, comprising an integrated duty cycle/amplitude/slew rate modulation block 41 which is controlled by a control block 42. The circuit can further comprise an optional output power filter circuit 43 to reduce voltage ripples due to the switching actions. The control block can be any typical feedback control block, with the input of the control block 42 is the output voltage Vout, which enters a feedback circuitry 42A, then compares with a reference voltage Vref, and the voltage difference is then amplified through an error amplifier circuit 42B. The modulation block 41 comprises a duty cycle modulation 41A, an amplitude modulation 41B, and a slew rate modulation 41C, with a modulation decider block 48. In a simplest configuration, the modulation decider 48 can be just a signal splitter, providing the error signal to all duty cycle, amplitude and slew rate modulations. The modulation block 41 takes the error signal from the control block 42 to the modulation decider block 48 to either generate a duty cycle modulation control signal through the duty cycle modulation circuit 41A, an amplitude modulation control signal through the amplitude modulation circuit 41B, a slew rate modulation control signal through the slew rate modulation circuit 41C, or any signal combination thereof. The duty cycle modulation control signal then controls the ON–OFF time of the input voltage Vin. The amplitude modulation control signal modulates the input voltage Vin, for example by controlling the amplitude of the voltage drop Vdrop between the input voltage Vin and the output voltage Vout. The slew rate modulation control signal modulates the rise and/or fall slew rate of the switching output voltage. These modulations are provided to the circuit power topology circuit 45. The circuit power topology is preferably a switching power topology circuit, but other power topologies such as linear power topology, are possible.

For high voltage differences between the target and the input voltage, for example in during ramp up or ramp down, or in circuits with high difference in Vin and Vout, duty cycle modulation provides high efficiency since the power loss is not dependent on the voltage difference. For small voltage differences, for example in steady state operation with small variations, duty cycle modulation loses the efficiency due to the high frequency needed to response for the small variation in output voltage. Thus the present integration voltage regulation provides a regulating circuit with high efficiency by integrating the duty cycle modulation with either the amplitude modulation, slew rate modulation, or both modulations.

Figure 5:
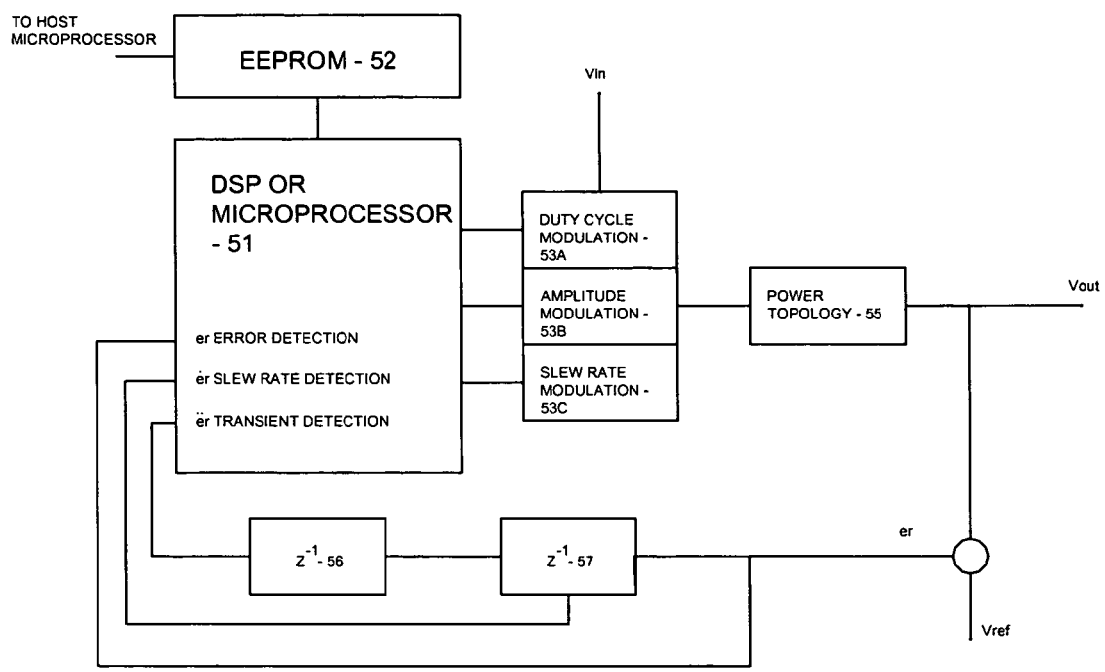
FIG. 5 shows an embodiment of the present invention voltage regulation comprising DSP circuitry.
Figure 6:
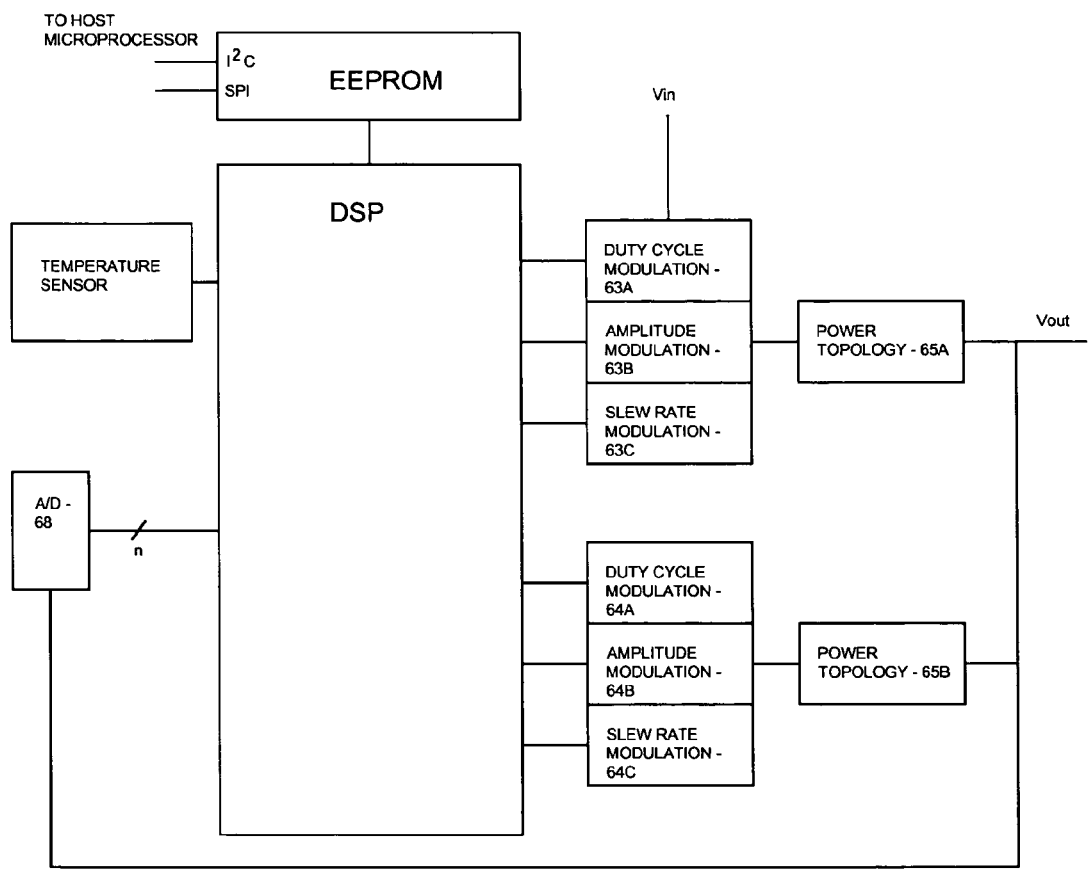
FIG. 6 shows an embodiment of the present invention voltage regulation comprising multiphase converter.
Figure 7A:
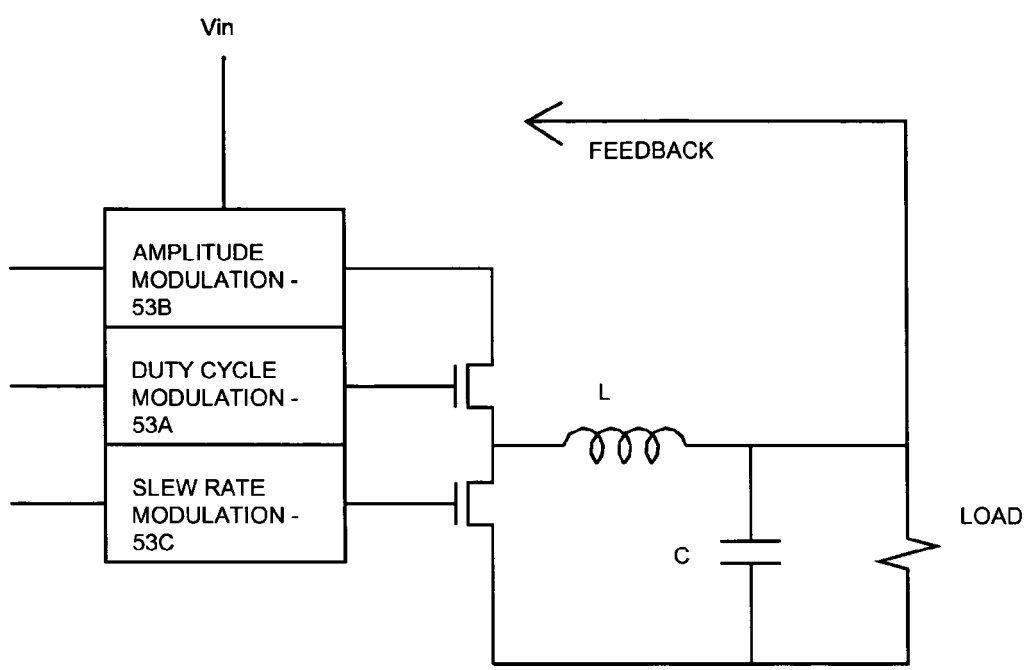
FIGS. 7A-7D show the embodiments of the present invention employing in a buck converter, a boost converter, a buck-boost converter and a flyback converter, respectively.
Figure 7B:
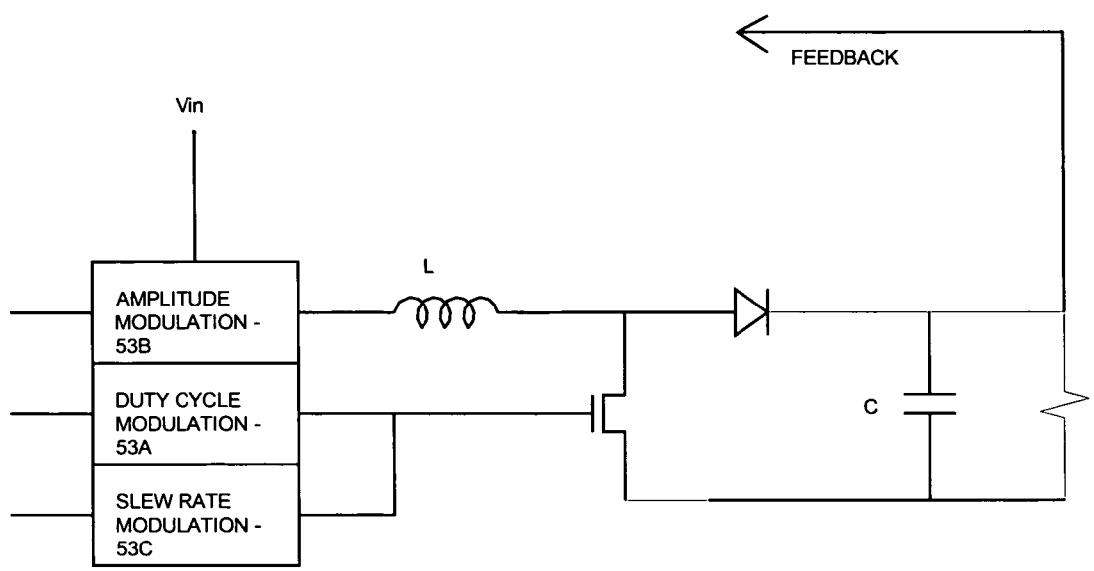
Figure 7C:
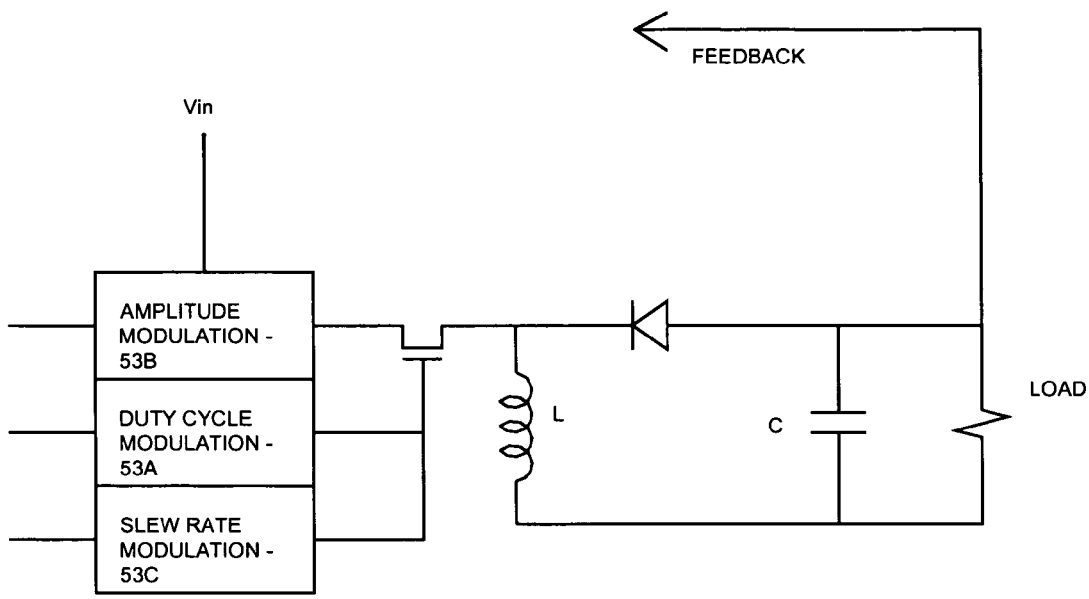
Figure 7D:
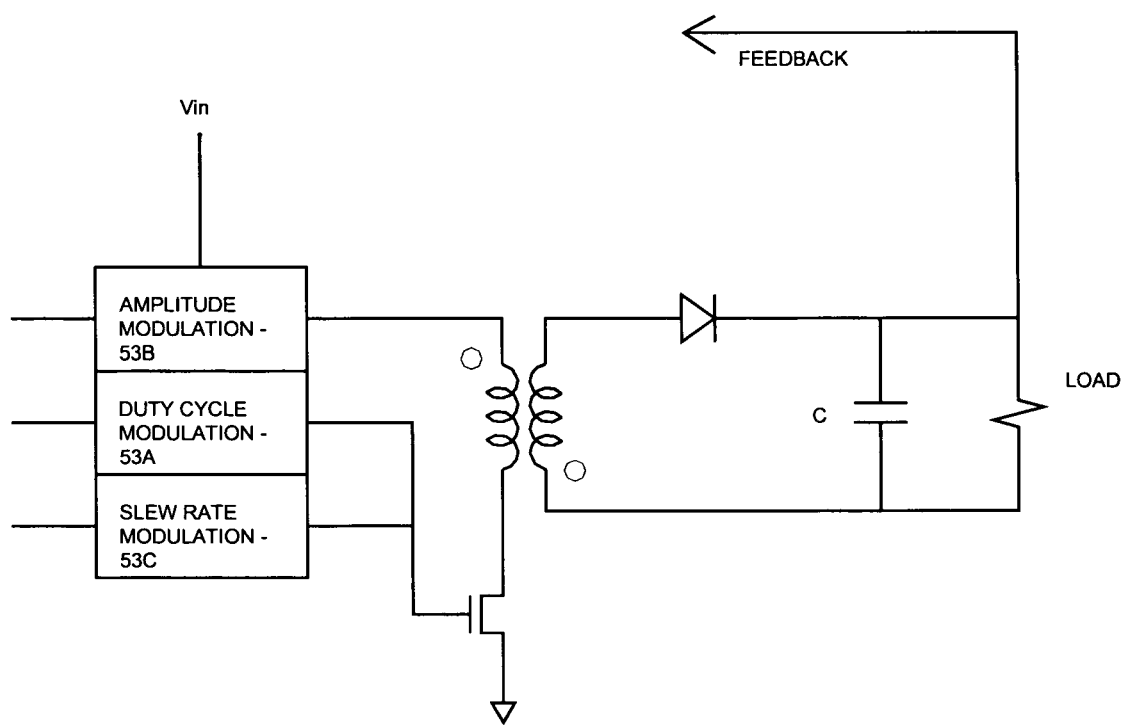

The system according to the present invention can further comprise a microprocessor or digital signal processing (DSP) circuitry for controlling the modulation operations. FIG. 5 shows an embodiment of the present invention comprising a DSP or microprocessor 51 and an EEPROM 52. The EEPROM 52 is getting input from a host microprocessor, and communicates with the DSP 51. The DSP 51 receives input from an error circuit, comprising the error voltage, the rate of change of the error voltage (first derivative), and the transient response (second derivative), and controls the duty cycle modulation 53A, the amplitude modulation 53B, and the slew rate modulation 53C. The modulations are then control the power toplogy circuit 55 to generate a regulated output voltage. A feedback loop provides the error voltage from a comparator circuit, plus derivative circuits 56 and 57 to provide first derivative and second derivative signals. All these error signals are provided to the DSP 51. FIG. 6 shows another embodiment for interleaved multiphase converter, comprising a plurality (two, as shown) of modulation circuits 63A/63B/63C and 64A/64B/64C with corresponding power topylogy circuits 65A/65B. The circuit further comprises an Analog to Digital (A/D) converter 68 to convert the analog Vout into n-component Vout-n digital signal for input into the DSP. The circuit further comprises a temperature sensor to measure the operating temperature.

The switching power topology circuit according to the present invention is preferably a DC to DC converter, which has many variations and extensions. The basic circuit topologies of isolated and non-isolated DC to DC converters are buck converter (single inductor with Vout<Vin), boost converter (single inductor; Vout<Vin), buck-boost converter (single inductor; Vout can be higher or lower than Vin), flyback converter (uses output transformer; allows multiple outputs with isolation), forward converter (uses output transformer; allows multiple outputs with isolation), Ćuk converter (uses a capacitor for energy storage; produces negative voltage for positive input), inverting charge-pump (modified Ćuk with single inductor; output voltage negative and higher-magnitude than positive input voltage), and SEPIC converter (two inductors; Vout can be higher or lower than Vin). The circuit can also comprise protection or compensation circuitry such as overcurrent protection or overtemperature protection.

FIGS. 7A-7D show an embodiment of the present invention as applied to a buck converter, a boost converter, a buck-boost converter, and a flyback converter, respectively. The amplitude modulation is preferably connected to the source or drain of the switch transistor to modify the amplitude of the output voltage. For circuits not requiring the amplitude modulation, the the source or drain of the switch transistor can be connected directly to the input voltage Vin. The switching modulation (or duty cycle modulation) and the slew rate modulation are preferably connected to the gates of the switch transistors to turn the switches on or off and to modify the rates of change of the output voltage.

The algorithm to regulate an output voltage according to the present invention comprises the setting of the duty cycle modulation first, and then the amplitude and/or the slew rate is adjusted accordingly. The transition points between these modulations, duty cycle modulation amplitude modulation and slew rate modulation, are selected to achieve minimum switching frequency and minimum voltage swing, so that for the same amount of energy delivered to the load, the algorithm can minimize the switching power loss and maximize the conversion efficiency. The transition points can be fixed for all circuit conditions, or the transition points can be varied according to the different regions in the voltage cycles, for example, in high voltage swing points as in load transient or load shedding modes, in low voltage swings as in steady state or power rejection modes, or in low power consumption mode. In low power mode, a fixed duty cycle and amplitude is set and the converter only needs to send out the control pulse when the output voltage drops below a certain pre-determined level from target voltage. Discontinuous mode was used in when the load current is low (but not lower power) to increase the power conversion efficiency. In load transient mode, the present invention circuit can provide faster response. For prior art circuit, when the duty cycle is maximum (i.e., 100%), this is also the maximum energy can deliver from input voltage source (Vin) in 1 frame. The converter may not compensate enough for the load transient. However if the amplitude is increased two folds, then with the same duty cycle (100%), the energy delivered is twice the energy amount to the load within one frame, thus the circuit provides faster response.

The transition points are also designed to achieve minimum energy needed to maintain the output voltage with a certain pre-determined limit around the target voltage, and minimizing the number of excitation from control loop to activate the modulation circuitry, and thus minimizing the computation load and power consumption from the control loop. The transition points can also be adjusted according to a compensation circuitry such as a current limiter or a temperature sensor providing the operating temperature.

Figure 8:
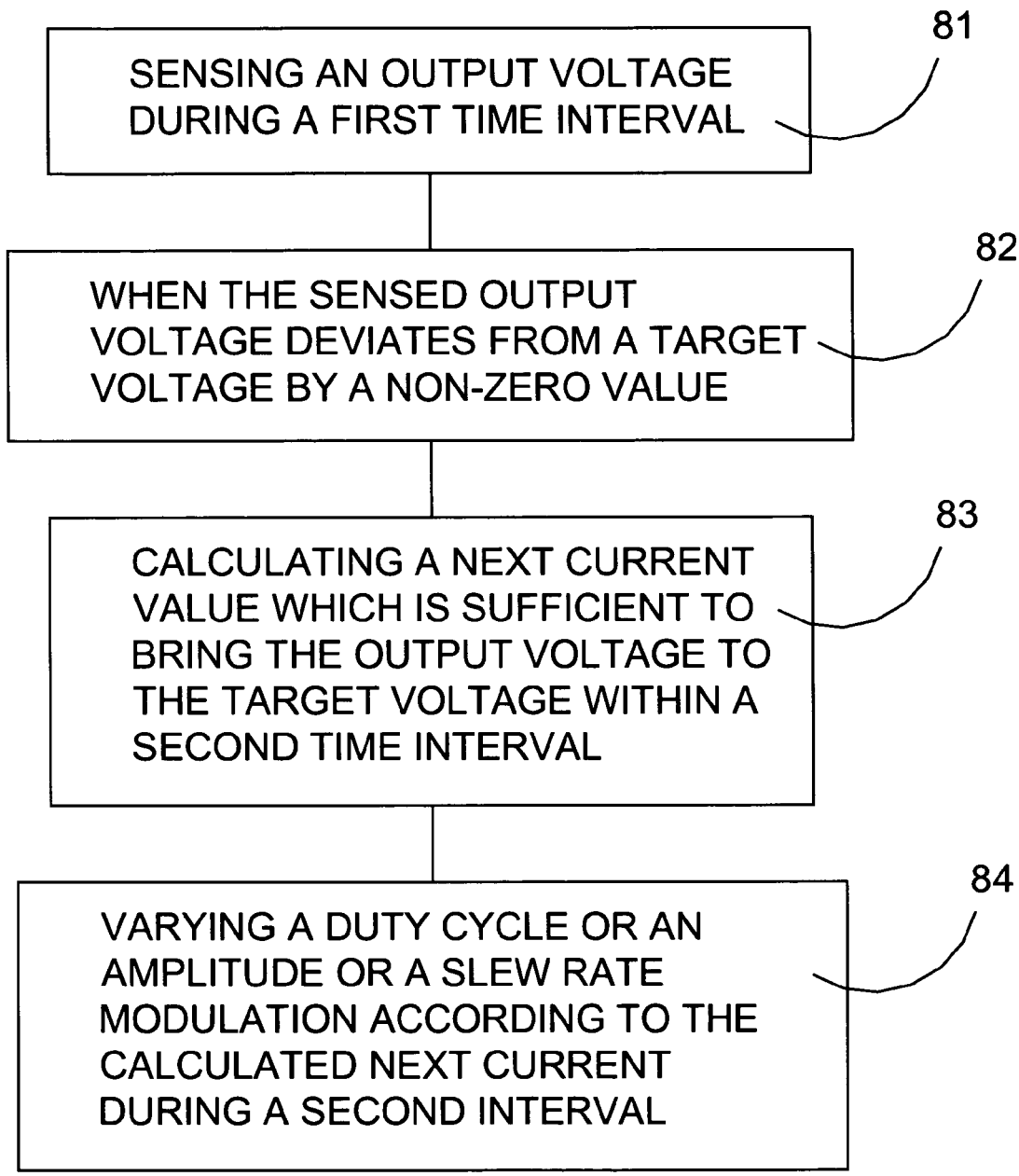
FIG. 8 shows an algorithm of the present invention voltage regulation.

FIG. 8 shows an algorithm according to the present invention. Step 81 senses an output voltage during a first time interval. When the sensed output voltage deviates from a target voltage by a non-zero value as in step 82, the circuit calculates a next current value in step 83 which is sufficient to bring the output voltage closest to the target voltage within a second time interval immediately following the first time interval. The next current value is preferably not exceeding a current limit, for example the saturation current in an inductor of the switching circuit, or the current limiter of the circuit. The duty cycle modulation and the amplitude/slew rate modulation circuitry is then operated to modify the output current in step 84 during the second time interval according to the calculated next current value. In one embodiment, the duty cycle modulation and the amplitude modulation circuitry varies by an amount necessary to bring the output voltage to the target voltage within a second interval to achieve fast response. In another embodiment, the duty cycle modulation and the amplitude modulation circuitry varies by less than an amount necessary to bring the output voltage to the target voltage within the second interval to achieve less overshoot.

The duty cycle modulation can be used for modulating voltages with high difference (e.g. high Vdrop) to achieve high efficiency. The power supply is regulated using a duty cycle modulation when an output is less than 85% of a target output. For small difference between the target and the input voltages (e.g. low Vdrop), the amplitude modulation can be used to achieve fast response and also low noise and high efficiency. The power supply is regulated using an amplitude modulation when an output is more than 50% of a target output. The duty cycle modulation control circuit can be a pulse width modulation (PWM), or a pulse frequency modulation (PFM). The method of controlling can be voltage-mode control where only the output voltage is monitored. The difference between the actual voltage and the desired voltage is an error voltage signal, and is used to control the modulation. The method of controlling can be current-mode control where both the output voltage and the output current are monitored. The voltage error signal can also be used to control the peak current during the on time. The method of controlling can be hysteretic control where the circuit is turned on if the output voltage drops below a certain limit, and the circuit is turned off when the output voltage exceeds another certain limit. The feedback control circuitry can operate on the principle of the difference between the sensed output voltage and the target voltage, the rate of change of the difference between the sensed output voltage and the target voltage, or the transient change (the second derivative of the difference).

Figure 9A:
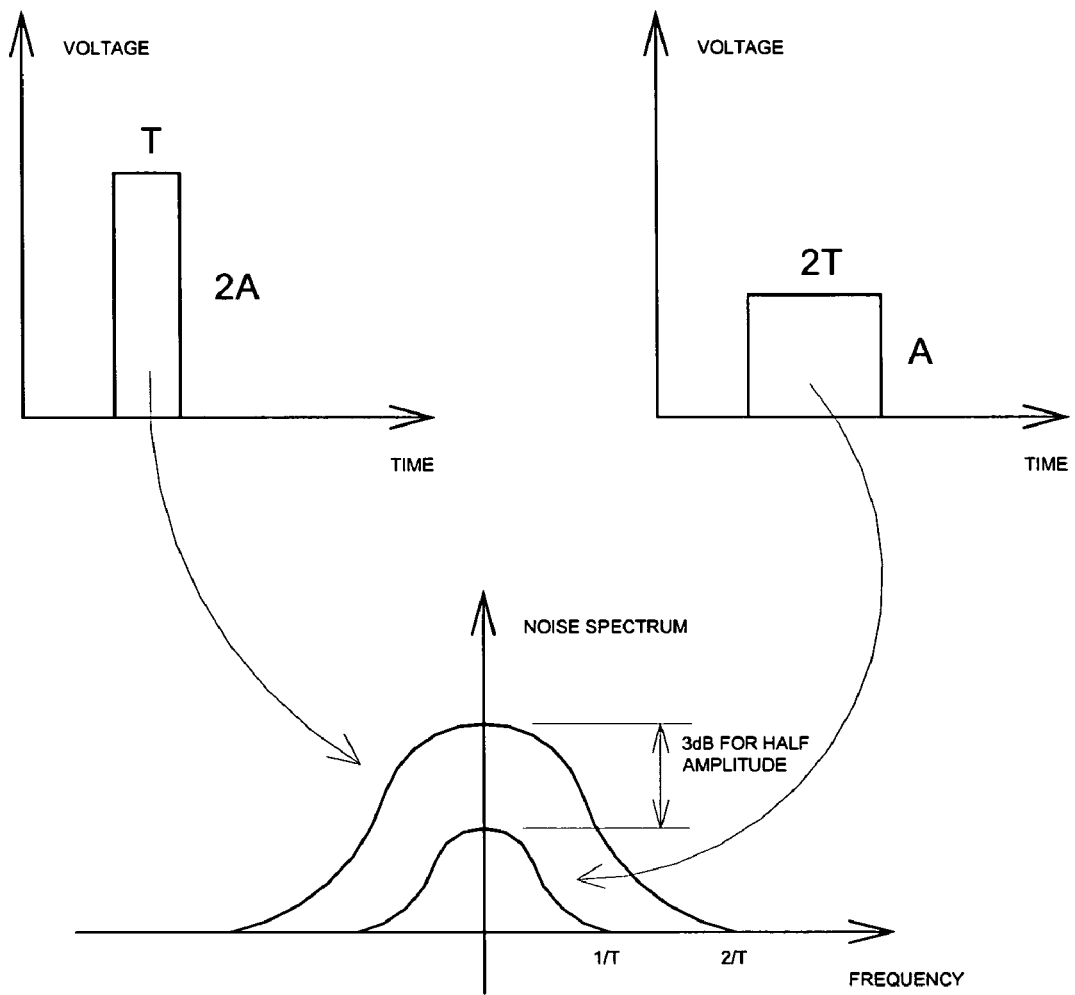
FIGS. 9A and 9B show the waveforms and the associated noise spectrum for the additional amplitude modulation.
Figure 9B:
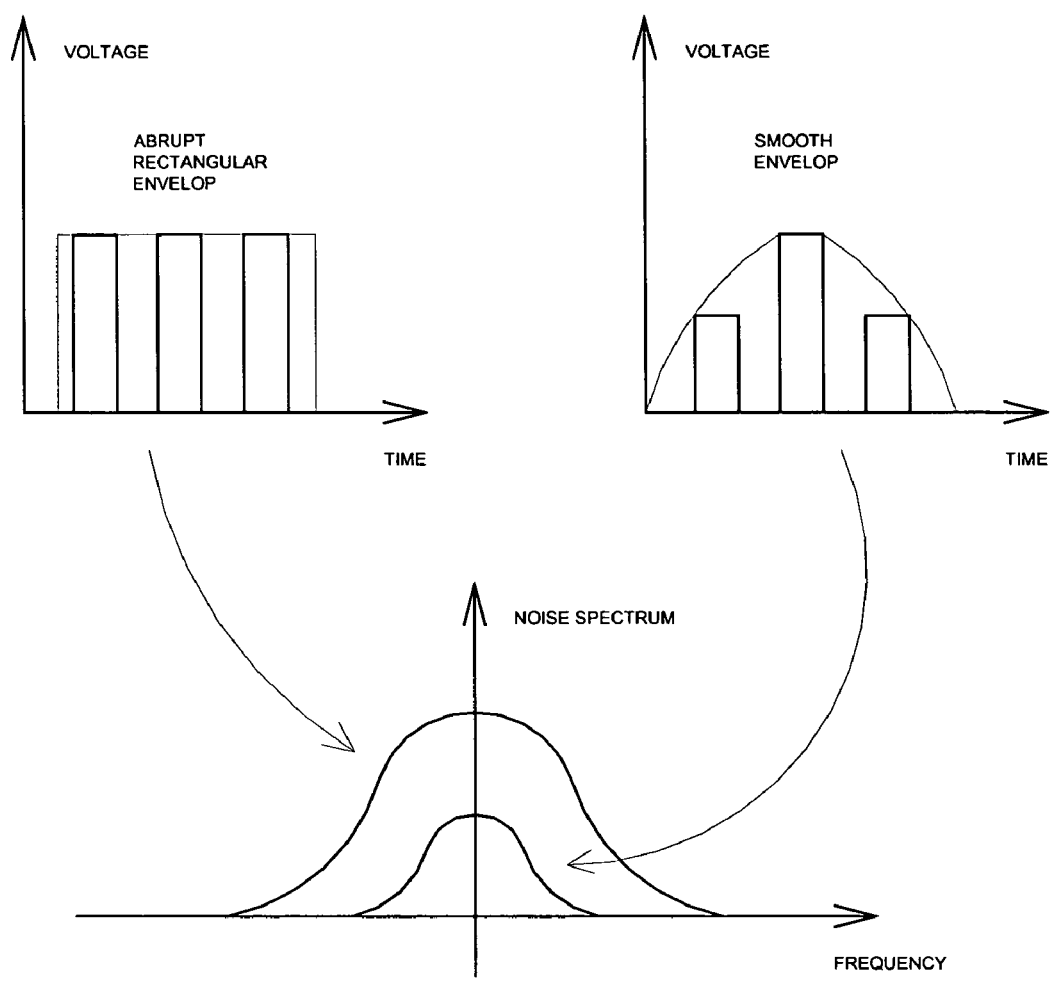
Figure 10A:
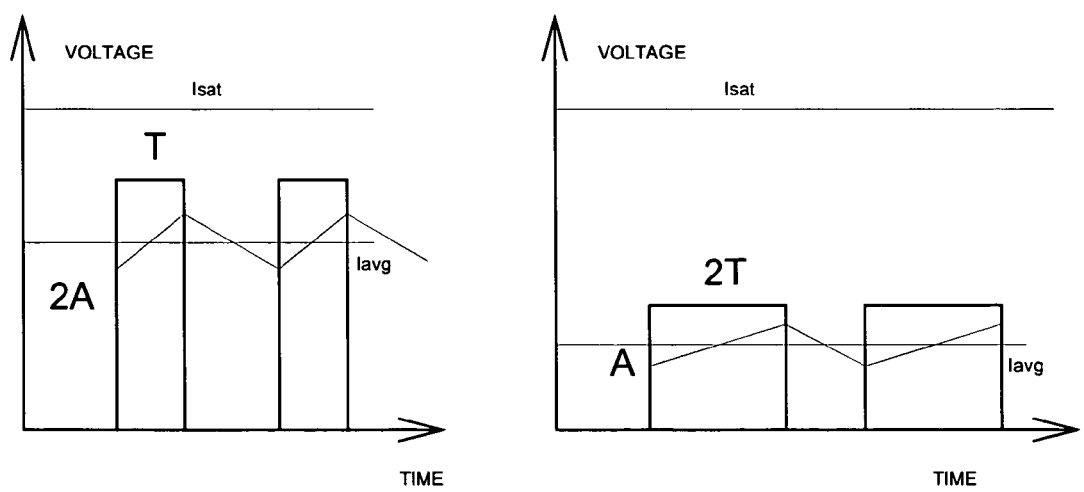
FIGS. 10A and 10B show the additional amplitude modulation on PWM and PFM switching modulation.
Figure 10B:
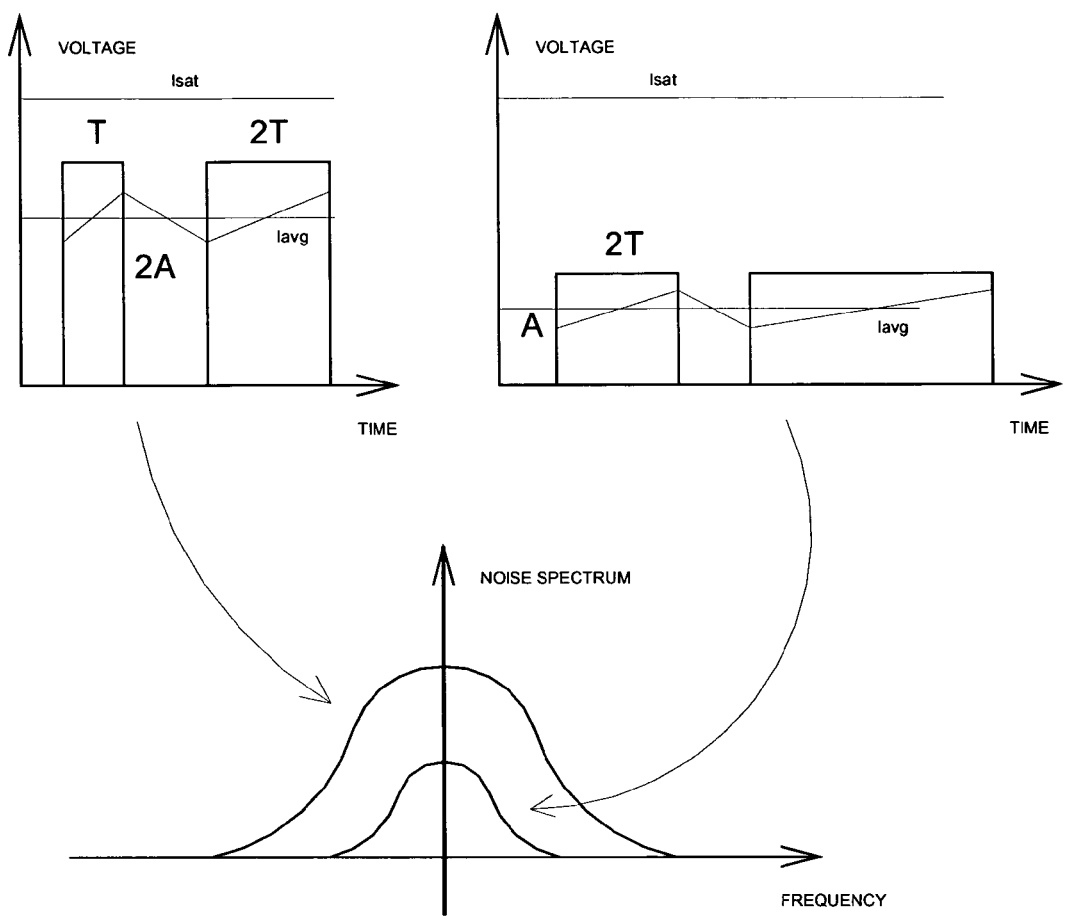

FIG. 9A shows a noise spectrum associated with an amplitude modulation. Keeping the delivered energy the same of 2AT by reducing the amplitude from 2A to A and increasing the time from T to 2T, the noise spectrum can be reduced by 3 dB for half the amplitude change. By lower the input voltage by amplitude modulation, lower parasitic switching loss can be achieved. FIG. 9B shows another noise spectrum associated with the integration of amplitude modulation with duty cycle modulation. With only duty cycle modulation, the voltage envelop is abrupt, as compared to a smooth envelop generated from the combination of amplitude modulation and duty cycle modulation, resulting in a reduced noise spectrum, especially at high frequencies. By lower the PWM resolution, the PWM frequency also decreases. Lower switching amplitude also results in lower noise. FIG. 10A shows a comparison between a PWM with amplitude 2A and a PWM with amplitude A. The time is increased with lower amplitude modulation, and therefore the average current for PWM with lower amplitude is lower than PWM with higher amplitude. FIG. 10B shows a comparison between a PFM (pulse frequency modulation) with amplitude 2A and a PFM with amplitude A. The time is increased with lower amplitude modulation, and therefore the average current for PFM with lower amplitude is lower than PFM with higher amplitude. Thus a duty cycle with amplitude modulation can results in less stress on the inductor, and requires smaller inductor saturation current, and thus can be designed with smaller inductor. In an embodiment, the present invention can be applied toward the optimization of integrated circuit area by minimizing the inductor and capacitor values of the voltage regulation circuitry, and thus reducing the circuit area and the PCB (Printed Circuit Board) accordingly. Because the adaptive control loop is very fast, the converter response frequency can be from 500 kHz to several MHz, leading to smaller inductor and capacitor. Further, smaller L & C with faster frequency translated into almost the same energy storage capability for the same performance.

The target voltage can also be divided into multiple ranges of voltage operation with each range of operation having different control parameters for different performance characteristics. Thus when the sensed voltage deviates from the target voltage, the deviation is used to calculate the range of voltage operation, and then the control parameters of this range of voltage operation are used in calculating the next current value and the resulting variation of duty cycle and amplitude modulation. The output states can be divided into 6 major output states, which are soft-start, steady, transient up, transient down, shut down and line transient. The major states can be further divided into minor states where during a major state many minor states may exist with different characteristics such as slope or target voltage. During major soft-start states, the control loop provided a constant soft-start rate dV/dt on the output voltage. The soft-start rate dV/dt for each soft-start states can be predefined as fixed parameters which do not change with time or adaptive parameters which adjust themselves using historical data. For a set of gradually decreased value of dV/dt, the output voltage rises nicely into the target voltage with minimum overshoot but with prolonged settling time. Overload or short-circuit detection also performs during this state when the commanded dV/dt parameter fails to bring the output voltage up. The different between commanded dV/dt and the measured dV/dt can be feed forward to an adaptive block for adaptive control operation. During major shut-down state, the constant discharge rate dV/dt behaves similarly. For a set of gradually increased value of dV/dt, the output voltage reduces nicely to zero with minimum undershoot but with prolonged shut-down time. For soft-start states and shut down states, the minor states can have different slope, meaning different voltage rate dV/dt.

During the steady state, a number of target voltages can be defined along with the transition time, in which the output voltage will transit to different target voltage in timely manner. For example, in the steady state of Buck converter, the capacitor current Ic is closed to 0, the inductor current IL is closed to the load current Iload, and the duty cycle (such as PWM) is almost a constant. A small gain can be used with a small filter to keep the output voltage within a small range of target voltage. In the major state of steady state operation, a number of minor steady states can be defined with different target voltage. For adaptive operation, an output voltage discharge rate can be measured in this states over time and feed forward to the adaptive block to adjust the gain.

During the transient state of transient down, transient up, or line transient state, the output voltage is adjusted to the target voltage at higher sampling rate of the Analog to Digital Converter (ADC) in a multi-rate configuration. For example, in the transient down(up) state of Buck converter, Iload is increased (decreased) and the PWM duty cycle needs to increase (decrease) by an amount proportional to the recovery gain and other parameters (Load, inductor coil L, capacitor C, etc.). In the line transient state of Buck converter, IL is increased (decreased) by Vin, so output voltage is followed, and the PWM duty cycle needs to decrease(increase) in proportional to delta Vin and other parameters. A small gain is used last to keep the output voltage within a small range of target voltage. A number of minor transient states can be defined with different recovery gain in the major transient state. A number of transient recovery gains can also be defined for different output voltage range along with transient recovery time. For adaptive operation, an output voltage recovery rate can be measured in this states over time and feed forward to the adaptive block to adjust the recovery gain.

The output voltage can be modulated in hostile environment with both the duty cycle and the amplitude are designed to adapt against temperature variation so that the optimum performance is achieved even with high variation in the operating temperature, measured by a temperature sensor. The output voltage can also be modulated in a low EMI (electromagnetic interference) noise environment to achieve optimum performance.

Figure 11:
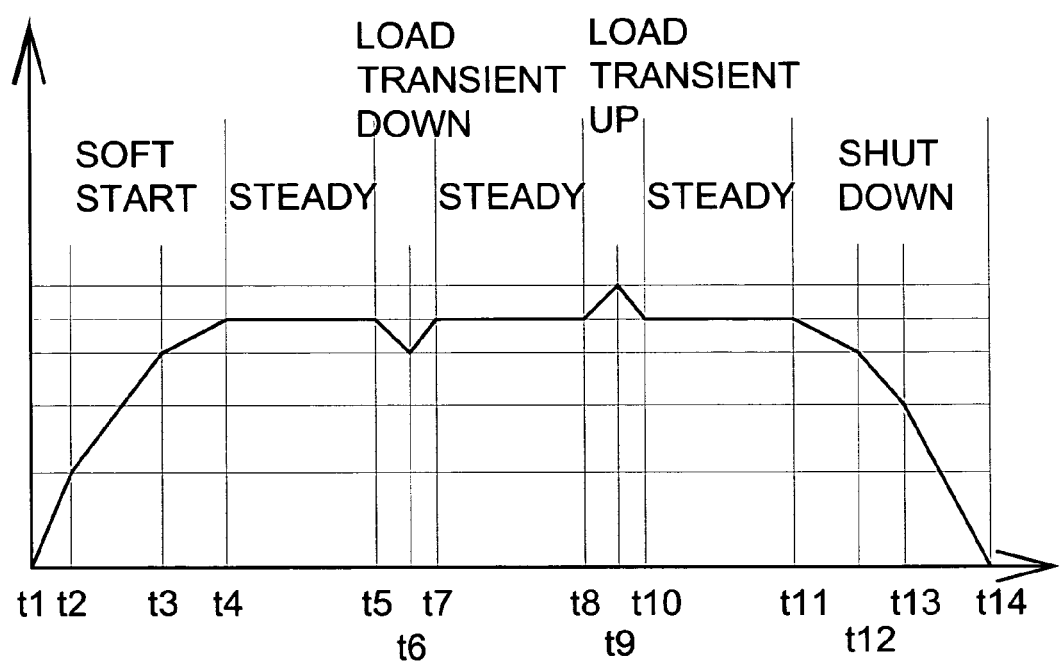
FIG. 11 shows an output voltage response comprising a plurality of various output states.
Figure 12:
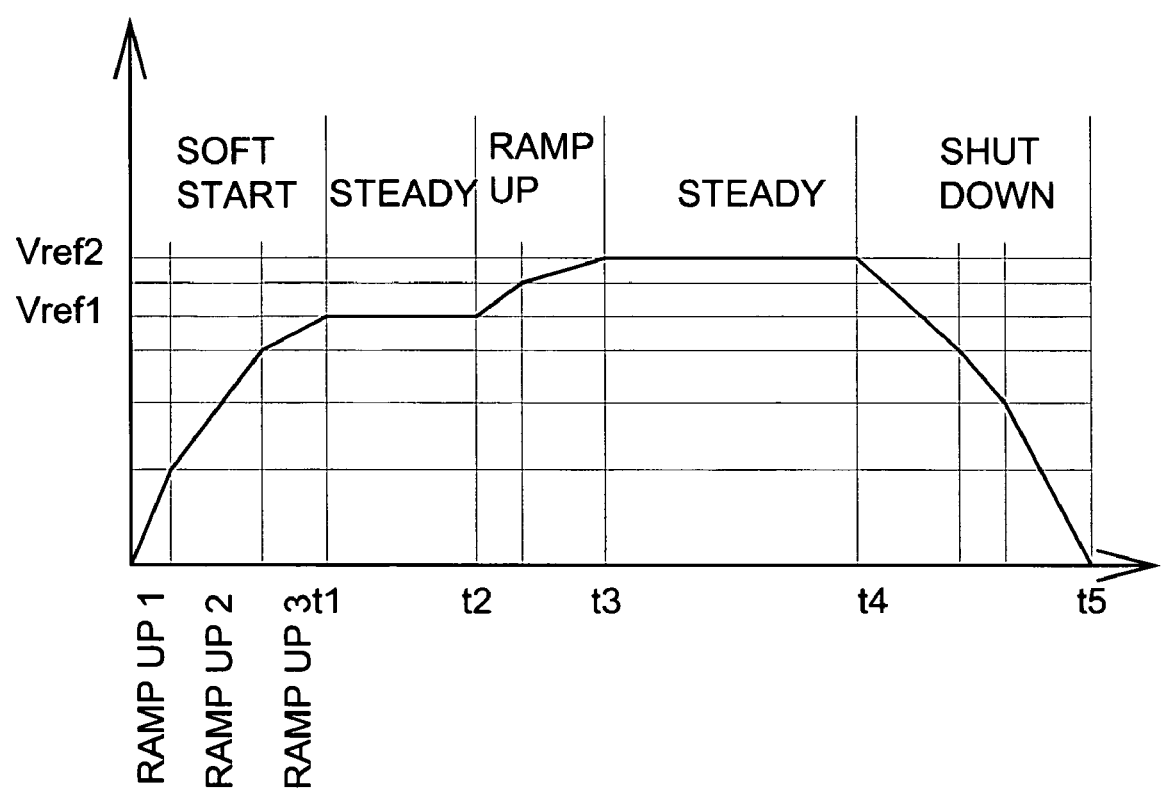
FIG. 12 shows another output voltage response comprising 2 reference voltages Vref1 and Vref2.

FIG. 11 shows an output voltage response comprising various output states: the soft-start state from t1 to t4; the steady state from t4 to t5, t7 to t8, and t10 to t11; the load transient down state from t5 to t7; the load transient up state from t8 to t10, and the shut down state from t11 to t14. The steady state corresponds to the voltage Vref, and the soft-start and the shut down states each comprises 4 minor states, each with different voltage rate dV/dt. FIG. 12 shows another output voltage response comprising 2 reference voltages Vref1 and Vref2. The soft-start state raises the output voltage to Vref1, and after keeping at Vref1 for a short steady state time, is ramped up to Vref2 for a second steady state time. The two reference voltages permit the reduction of overshoot voltage.

The variation of the duty cycle modulation and the amplitude modulation circuitry can be controlled by the magnitude of the difference between the sensed output voltage and the target voltage. The variation can also be controlled by the rate of change of this difference (i.e. first derivative), or the transient response of the difference (i.e. second derivative). The control scheme can be a rule-based control scheme which is most suitable for statistical adaptive and/or fuzzy and/or neural network implementation. These variations can be compiled to create a history of the converter performance, which can be used to adapt the control parameters of the converter for the best performance. The control parameters can be the energy efficiency of the converter, the static DC error, the load regulation, the line regulation, the rate of error, the settling time, the overshoot and the undershoot voltage, the load transient recovery time, and the line transient recovery time. Each criteria of performance can be arranged in an order of priority. The adaptive parameters can be used to compensate for ambient temperature variation, component aging or catastrophic change to the converter's components. The adaptive block can also make use of the history of the performance indicator to compose a statistical hidden Markov-chain model for each state. States with the highest probability will be optimized first in terms of overall cost and performance. States with lowest probability can be sacrificed in terms of overall cost and performance. These adaptive parameters can be used for totally or partially replacing the calibration process of the converter for mass-production manufacturing. These adaptive parameters can be used for lessening the parametric dependency of the converter's topology and configuration.

For the converter already in steady state with minimum fluctuations, for some reasons such as temperature fluctuation, aging, short circuit conditions, the inductor could lose half of its value which makes Vout fluctuates more frequently with large undershoot/overshoot and increase settling time. The control loop detects these condition and responses by increases the duty cycle and amplitude of the pulses beyond the normal conditions by certain calculated values. After a pre-determined number of adaptive responses and if the performance does not improve, the control loop will report to the host processor via interrupt or go to shutdown mode depending on user pre-program information in the EEPROM.

Figure 13:
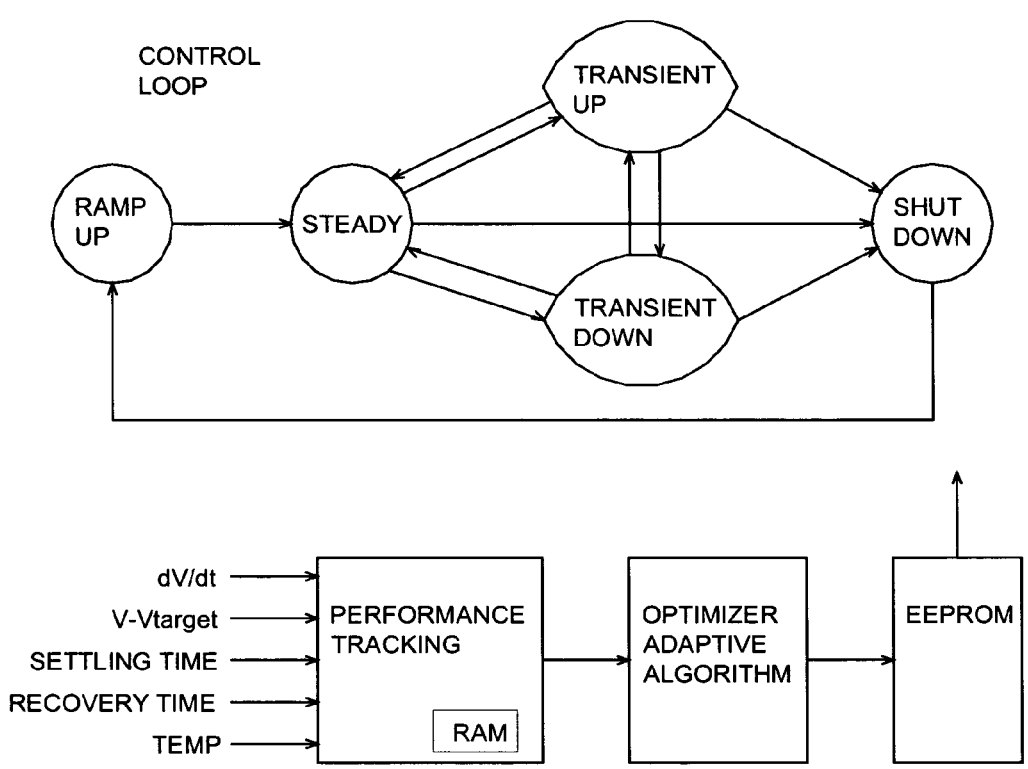
FIG. 13 shows an embodiment of the adaptive control of the present invention.

FIG. 13 shows an embodiment of the adaptive control of the present invention. The control loop comprises the various states of ramp up (or soft-start), steady, transient up, transient down, and shut down. These states are serviced by an EEPROM whose data is provided from an optimizer for adaptive algorithm. The data for the optimizer is provided from a performance tracking circuit with memory. The performance tracking circuit collected data from the difference in the output voltage and the target voltage, the rate of the change of the difference (dV/dt), the second derivative, the settling time, the recovery time, and the temperature.

What is claimed is:

1. A method for regulating a power supply, the method comprising
regulating the power supply with a combination of duty cycle modulation and amplitude modulation,
wherein the regulation is based on an error signal between an actual output and the target output,
wherein regulating the power supply comprises regulating a voltage output according to the formula $V\text{out} = (V\text{in} - V\text{amp}) * (\text{Duty Cycle})$ wherein the regulator comprises a duty cycle modulation by modulating Duty Cycle, and
wherein the regulator comprises an amplitude modulation by modulating Vamp.

2. A method as in claim 1 further comprising the steps of sensing an output;
calculating the error signal from the sensed output to the target output.

3. A method as in claim 1 wherein the duty cycle modulation is regulated during a ramp up or ramp down period of the power supply regulation.

4. A method as in claim 1 wherein the amplitude modulation is regulated during a steady state period of the power supply regulation.

5. A method as in claim 1 wherein the selection between the duty cycle modulation and the amplitude modulation is based on fast response time, less overshoot, minimum switching frequency, minimum voltage swing, minimum switching power loss, maximum conversion efficiency, or a combination thereof.

6. A method as in claim 1 wherein the amplitude modulation regulates the amplitude of the voltage or current of the power supply.

7. A method as in claim 1 further comprising a microprocessor or a digital signal processor (DSP) to control the regulation.

8. A method for regulating a power supply, the method comprising
regulating the power supply using a duty cycle modulation when an output is less than 85% from the target output;
regulating the power supply using an amplitude modulation when an output is more than 50% from the target output,
wherein regulating the power supply comprises regulating a voltage output according to the formula $$Vout=(Vin-Vamp)*(Duty\ Cycle)$$

wherein the regulator comprises a duty cycle modulation by modulating Duty Cycle, and
wherein the regulator comprises an amplitude modulation by modulating Vamp.

9. A method as in claim 8 further comprising the steps of sensing an output;
calculating an error from the sensed output to a target output.

10. A method as in claim 8 wherein the selection between the duty cycle modulation and the amplitude modulation is further based on fast response time, less overshoot, minimum switching frequency, minimum voltage swing, minimum switching power loss, maximum conversion efficiency, or a combination thereof.

11. A method for adaptive regulating a power supply, the method comprising
regulating the power supply with a combination of duty cycle modulation and amplitude modulation based on an optimizer adaptive algorithm,
wherein the optimizer adaptive algorithm is developed based on a tracking of the performance of the power supply,
wherein regulating the power supply comprises regulating a voltage output according to the formula $$Vout=(Vin-Vamp)*(Duty\ Cycle)$$

wherein the regulator comprises a duty cycle modulation by modulating Duty Cycle, and
wherein the regulator comprises an amplitude modulation by modulatine Vamp.

12. A method as in claim 11 wherein the adaptive algorithm comprises a statistical adaptive, a fuzzy, or a neural network implementation.

13. A method as in claim 11 wherein the performance tracking comprises the compilation of the performance of the power supply.

14. A method as in claim 11 wherein the adaptive algorithm comprises the adaptation of control parameters of the regulating of the power supply.

15. A method as in claim 14 wherein the control parameters comprises the energy efficiency, the static DC error, the load regulation, the line regulation, the rate of error, the settling time, the overshoot, the undershoot voltage, the load transient recovery time, the line transient recovery time, a combination thereof.

16. A method as in claim 14 wherein the adaptation of control parameters are used for compensate for ambient temperature, component aging, or catastrophic change to components.

17. A method as in claim 14 wherein the adaptation of control parameters are used for replacing the calibration process of the regulator, or for lessening the parametric dependency of the regulator's topology and configuration.

* * * * *